United States Patent
Aga et al.

(10) Patent No.: US 12,417,178 B2
(45) Date of Patent: Sep. 16, 2025

(54) PROGRAMMABLE DATA STORAGE MEMORY HIERARCHY

(71) Applicant: Advanced Micro Devices, Inc., Santa Clara, CA (US)

(72) Inventors: Shaizeen Dilawarhusen Aga, Santa Clara, CA (US); Johnathan Robert Alsop, Seattle, WA (US); Nuwan S Jayasena, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 8 days.

(21) Appl. No.: 18/068,670

(22) Filed: Dec. 20, 2022

(65) Prior Publication Data

US 2024/0202121 A1 Jun. 20, 2024

(51) Int. Cl.
*G06F 12/08* (2016.01)
*G06F 12/0811* (2016.01)
*G06F 12/0891* (2016.01)

(52) U.S. Cl.
CPC ...... *G06F 12/0811* (2013.01); *G06F 12/0891* (2013.01)

(58) Field of Classification Search
CPC .......... G06F 12/0811; G06F 12/0891
See application file for complete search history.

(56) References Cited

U.S. PATENT DOCUMENTS

| | | | | |
|---|---|---|---|---|
| 6,665,767 B1* | 12/2003 | Comisky | ............ | G06F 12/0891 711/143 |
| 10,552,058 B1* | 2/2020 | Jadon | .................... | G06F 3/0647 |
| 2009/0113403 A1* | 4/2009 | Davis | ..................... | G06F 8/443 717/146 |
| 2017/0357585 A1* | 12/2017 | Moyer | .................. | G06F 12/126 |
| 2018/0181494 A1* | 6/2018 | Malladi | ............... | G06F 12/0811 |
| 2019/0004958 A1* | 1/2019 | Vasudevan | ............ | G06F 3/0619 |
| 2020/0242040 A1* | 7/2020 | Iyer | ..................... | G06F 12/0891 |

FOREIGN PATENT DOCUMENTS

CN 104115129 A * 10/2014 ......... G06F 12/0238

* cited by examiner

*Primary Examiner* — Masud K Khan
(74) *Attorney, Agent, or Firm* — FIG. 1 Patents

(57) ABSTRACT

Programmable data storage memory hierarchy techniques are described. In one example, a data storage system includes a memory hierarchy and a data movement controller. The memory hierarchy includes a hierarchical arrangement of a plurality of memory buffers. The data movement controller is configured to receive a data movement command and control data movement between the plurality of memory buffers based on the data movement command.

20 Claims, 5 Drawing Sheets

PROGRAMMABLE DATA STORAGE MEMORY HIERARCHY

BACKGROUND

Processor devices, such as central processing units, parallel processors, graphics processing units, and so forth are tasked with processing ever-increasing amounts of data. Access to this data is a significant factor in a speed, at which, the processor devices are able to process the data. To address this, memory buffers are employed to speed this access, an example of which include cache systems having a plurality of cache levels. Conventional techniques used to implement cache systems, however, are typically workload agnostic and are limited to control of data movement internally to the cache system as following a hierarchical arrangement of the cache levels. As a result, these conventional techniques introduce challenges that hinder operation of the processor units in conventional real-world scenarios, the effect of which is compounded by the ever-increasing amounts of data.

BRIEF DESCRIPTION OF THE DRAWINGS

The detailed description is described with reference to the accompanying figures.

DETAILED DESCRIPTION

Overview

Figure 1:
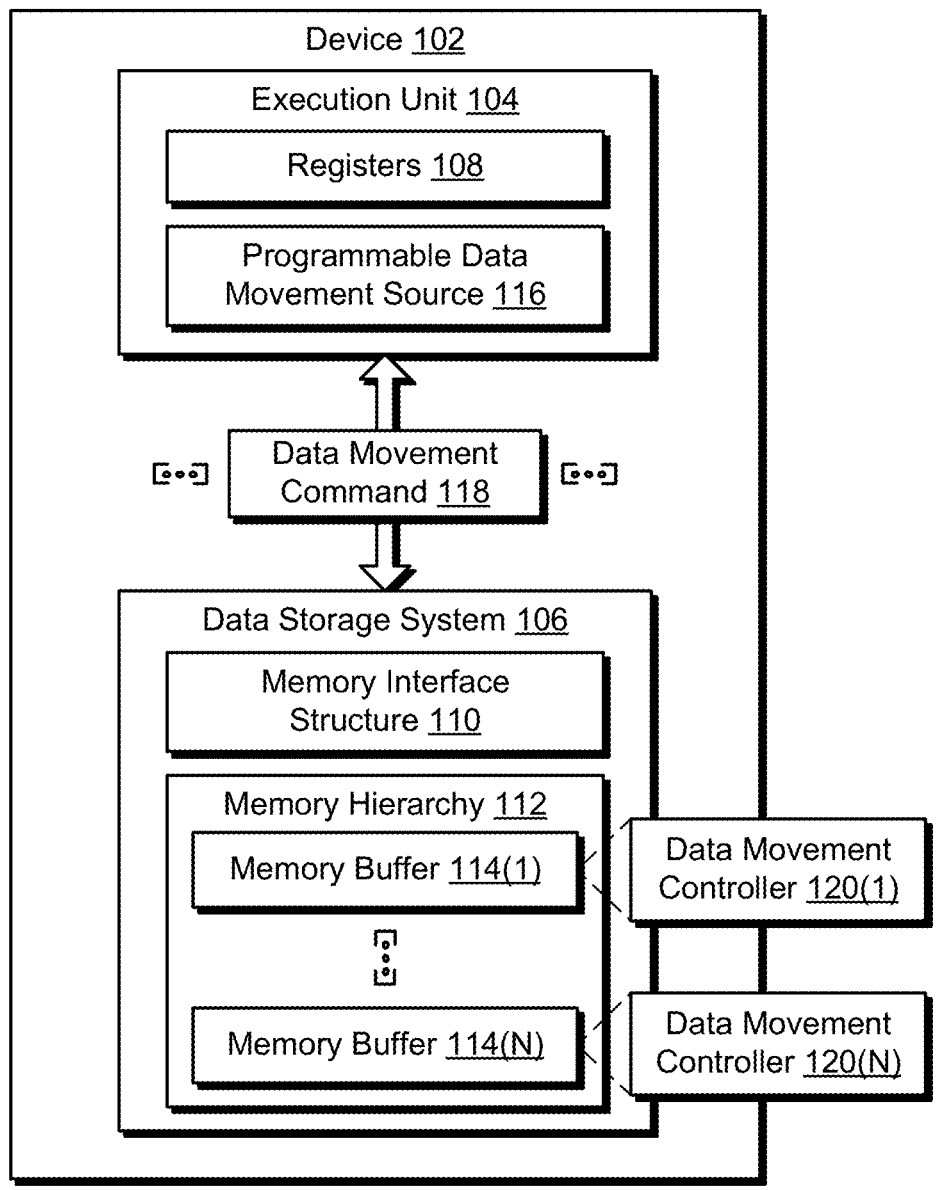
FIG. 1 is a block diagram of a non-limiting example system configured to employ programmable data storage memory hierarchy techniques.

Conventional approaches to data storage (e.g., "on chip") encounter inefficiencies resulting from configuration using workload-agnostic and transparent-to-programmer solutions or configuration as workload-specific specialized data storage. In the first configuration, a programmer does not have control over data residency or data movement, e.g., as a conventional processor cache. On the contrary, application specific integrated circuits are specialized in support of specific use cases, and as such, use of this conventional approach is limited to those use cases implemented internally to the application specific integrated circuits and are not scalable.

To solve these problems, a programmable data storage memory hierarchy is described having augmentations that support an ability to implement programmable data movement. This approach supports a variety of technical advantages, examples of which include enablement of workload-aware optimizations while leveraging existing cache/coherence infrastructure, performance improvements and energy savings due to proactive data movement, and a lowering in cache pollution. As such, these techniques improve device operation and provide an ability to support workload evolution, such as that encountered in artificial intelligence and machine learning.

In examples, a programmable data storage memory hierarchy includes mechanisms to augment data storage structures (e.g., caches, scratchpads) and data interface structures (e.g., memory controllers) to support programmable data movement within the data storage structures. This includes configuration as a memory hierarchy having a hierarchical arrangement of a plurality of memory buffers, e.g., cache levels, that is configurable to include memory buffers as peers in a same level, in different levels, and so forth. This configuration also includes a data movement controller, e.g., implemented at respective levels in the memory buffers. The data movement controller is configured to receive a data movement command and control data movement, programmatically, between the plurality of memory buffers. The data movement controller is configurable in a variety of ways. In a first example, the data movement controller is implemented as an augmentation to existing cache controllers. In this example, the data movement controller is configurable to implement data movement between cache levels as following existing cache structures. Data movement between a level two cache of a first core and a level two cache of a second core, for instance, is programmable to follow a path that includes a shared level three cache. In a second example, the data movement controller is configurable to leverage communication pathways that are added to support data movement directly between the cache levels within a core and/or between cores, e.g., directly between the level two caches for the first and second cores without utilizing a shared level three cache.

The data movement command, for instance, is originated by an execution unit (e.g., through software execution) and is configurable to specify where data is to be communicated to and/or where data is to be obtained from within the memory hierarchy. This differs from conventional approaches in which data movement is limited to control by internal logic used to implement a cache/coherence infrastructure within respective levels of the memory hierarchy. For example, in conventional approaches data movement is controlled within respective levels of the hierarchy based on recency of data access to control "what" data is stored at respective levels, which is not controllable outside of the hierarchy.

In the techniques described herein, however, a data movement command is configurable to specify an address range (e.g., as contiguous or non-contiguous) from which data is to be obtained in the memory hierarchy. Data movement commands are also configurable to specify a destination in the memory hierarchy of where the data is to be transmitted to and stored. This is performable as part of a push command, a fetch command, a combination push-and-fetch command, and so forth. In this way, the techniques and systems described herein are configurable to support workload-aware optimizations using programmatic techniques while leveraging existing cache and coherence infrastructures, e.g., to control data flow through levels of the hierarchy based on recency of access, spatial locality, and so forth. A variety of other instances are also contemplated, examples of which are described in the following discussion and shown using corresponding figures.

In some aspects, the techniques described herein relate to a data storage system including a memory hierarchy having a hierarchical arrangement of a plurality of memory buffers, and a data movement controller configured to receive a data movement command and control movement of data between the plurality of memory buffers based on the data movement command.

In some aspects, the techniques described herein relate to a data storage system, wherein the data movement command is a push that specifies a location in the plurality of memory buffers, to which, the data is to be transmitted.

In some aspects, the techniques described herein relate to a data storage system, wherein the data movement command identifies the location as an address range, to which, the data is to be transmitted or a memory buffer of the plurality of memory buffers, to which, the data is to be transmitted.

In some aspects, the techniques described herein relate to a data storage system, wherein the data movement command is a cache eviction that includes an indication of a location in the plurality of memory buffers, to which, the data is to be evicted.

In some aspects, the techniques described herein relate to a data storage system, wherein the data movement command is a fetch that includes an indication of a location in the plurality of memory buffers, from which, the data is to be obtained.

In some aspects, the techniques described herein relate to a data storage system, wherein the data movement command specifies a path identifying one or more memory buffers of the plurality of memory buffers, through which, the data is to be transmitted.

In some aspects, the techniques described herein relate to a data storage system, wherein the memory hierarchy is configured as a cache system included in hardware as part of a processing device, the plurality of memory buffers is configured as a plurality of cache levels of the cache system included as part of the processing device, and the data movement command is generated through software executed by an execution unit included in the hardware of the processing device.

In some aspects, the techniques described herein relate to a data storage system, wherein the data movement controller is one of a plurality of data movement controllers associated, respectively, with the plurality of cache levels.

In some aspects, the techniques described herein relate to a data storage system, wherein the data movement controller includes a peer map that is programmable as providing a mapping between the plurality of memory buffers.

In some aspects, the techniques described herein relate to a data storage system, wherein the data movement controller includes a command queue that is configured to queue and order execution of one or more data movement commands In some aspects, the techniques described herein relate to a data storage system, wherein the data movement controller is configured to provide an ordering primitive indicating of completion of the data movement command at a specific memory buffer of the plurality of memory buffers.

In some aspects, the techniques described herein relate to a data storage system, wherein the data movement controller is configured to delay or drop data movement based on an inference that the data movement command hinders performance.

In some aspects, the techniques described herein relate to a data storage system, the data movement controller is configured to cancel the data movement command based on receipt of a cancel command.

In some aspects, the techniques described herein relate to a data storage system, wherein the data movement controller is configured to block external access to the data that is a subject of the data movement command until receipt of a completion acknowledgement.

In some aspects, the techniques described herein relate to a device including an execution unit implemented in hardware of an integrated circuit and configured to generate data movement commands, and a data storage system implemented in the hardware of the integrated circuit, the data storage system including a plurality of data movement controllers disposed, respectively, in a plurality of cache levels, the plurality of data movement controllers configured to control data movement between the plurality of cache levels through execution of the data movement commands.

In some aspects, the techniques described herein relate to a device, wherein the data movement commands include a push command that is configured to transmit data to a respective cache level of the plurality of cache levels.

In some aspects, the techniques described herein relate to a device, wherein the data movement commands include a fetch command that is configured to cause data to be transmitted from a respective cache level of the plurality of cache levels.

In some aspects, the techniques described herein relate to a device, wherein the plurality of data movement controllers includes, respectively, a plurality of finite state machines configured to process the data movement commands.

In some aspects, the techniques described herein relate to a method including receiving a data movement command from an execution unit at a data movement controller of a data storage system, and transmitting data between a first memory buffer specified by the data movement command and a second memory buffer specified by the data movement command by executing the data movement command by the data movement controller, the first memory buffer and the second memory buffer arranged to form a subset of a memory hierarchy.

In some aspects, the techniques described herein relate to a method, wherein the data movement command is received through execution of an operating system or application by the execution unit.

FIG. 1 is a block diagram of a non-limiting example system 100 configured to employ programmable data storage memory hierarchy techniques. The example system 100 includes a device 102 having an execution unit 104 and a data storage system 106. The device 102 is configurable in a variety of ways. Examples of device configurations include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. It is to be appreciated that in various implementations, the device 102 is configured as any one or more of those devices listed above and/or a variety of other devices without departing from the spirit or scope of the described techniques.

The execution unit 104 includes registers 108 that are configured to maintain data that is processed by the execution unit 104, e.g., for arithmetic and logic operations. The execution unit 104, for instance, performs operations based on instructions included in software, e.g., operating systems, applications, and so forth.

The data storage system 106 includes a memory interface structure 110 and a memory hierarchy 112 in the illustrated example. The memory hierarchy 112 includes a plurality of memory buffers, which are represented as memory buffers 114(1), ..., 114(N) and associated data movement controllers 120(1), ..., 120(N). Data movement within the memory hierarchy 112 is controllable by the data movement controllers 120(1)-120(N) to control data movement. The data movement controllers 120(1)-120(N), for instance, in a caching scenario are configurable to implement existing caching techniques to control data movement, e.g., based on recency of data access, spatial locality (such as nearness of data within memory to other data that is accessed), and so forth.

The execution unit 104 in this example also includes a programmable data movement source 116 that is representative of functionality to originate a data movement command 118 to control data movement, programmatically, within the data storage system 106. Upon receipt of the data movement command 118, for instance, the data movement controllers 120(1)-120(N) of the respective memory buffers 114(1)-114(N) within the memory hierarchy 112 control where data is obtained for inclusion within a respective buffer and/or where data is transmitted to from a respective buffer. As a result, movement of data within the memory buffers 114(1)-114(N) is programmable by the programmable data movement source 116, which is not possible in conventional techniques.

The memory buffers 114(1)-114(N) and corresponding data movement controllers 120(1)-120(N) are configurable in a variety of ways, examples of which include leveraging existing on-chip storage and coherence infrastructures. The data movement controllers 120(1)-120(N), for instance, are configurable to include logic that controls what data is maintained internally within respective buffers, e.g., based on recency of data use, spatial locality considerations, and so forth.

The data movement controllers 120(1)-120(N) are also augmented to support programmatic functionality such that a data movement command 118 originated "outside" of the data storage system 106 is usable to control data movement between the buffers. This is implemented in this example by overlaying programmability thereon to provide control to programmers that create software executable as the programmable data movement source 116 to initiate data movement and from this improve operation and power efficiency of the device 102.

In one example, the data storage system 106 is configurable using scratchpad memory (SPM). Scratchpad memory is implemented as internal memory of the device 102 for use in support of non-uniform memory access (NUMA) latencies. In some instances, the scratchpad memory is configured such that a copy of data is not maintained that is also stored in main memory. Scratchpad memory, for instance, is utilized to maintain data for temporary results that are typically not committed to main memory. In another example, the data storage system 106 is configured as a cache system, an example of which is described as follows and shown in a corresponding figure.

Figure 2:
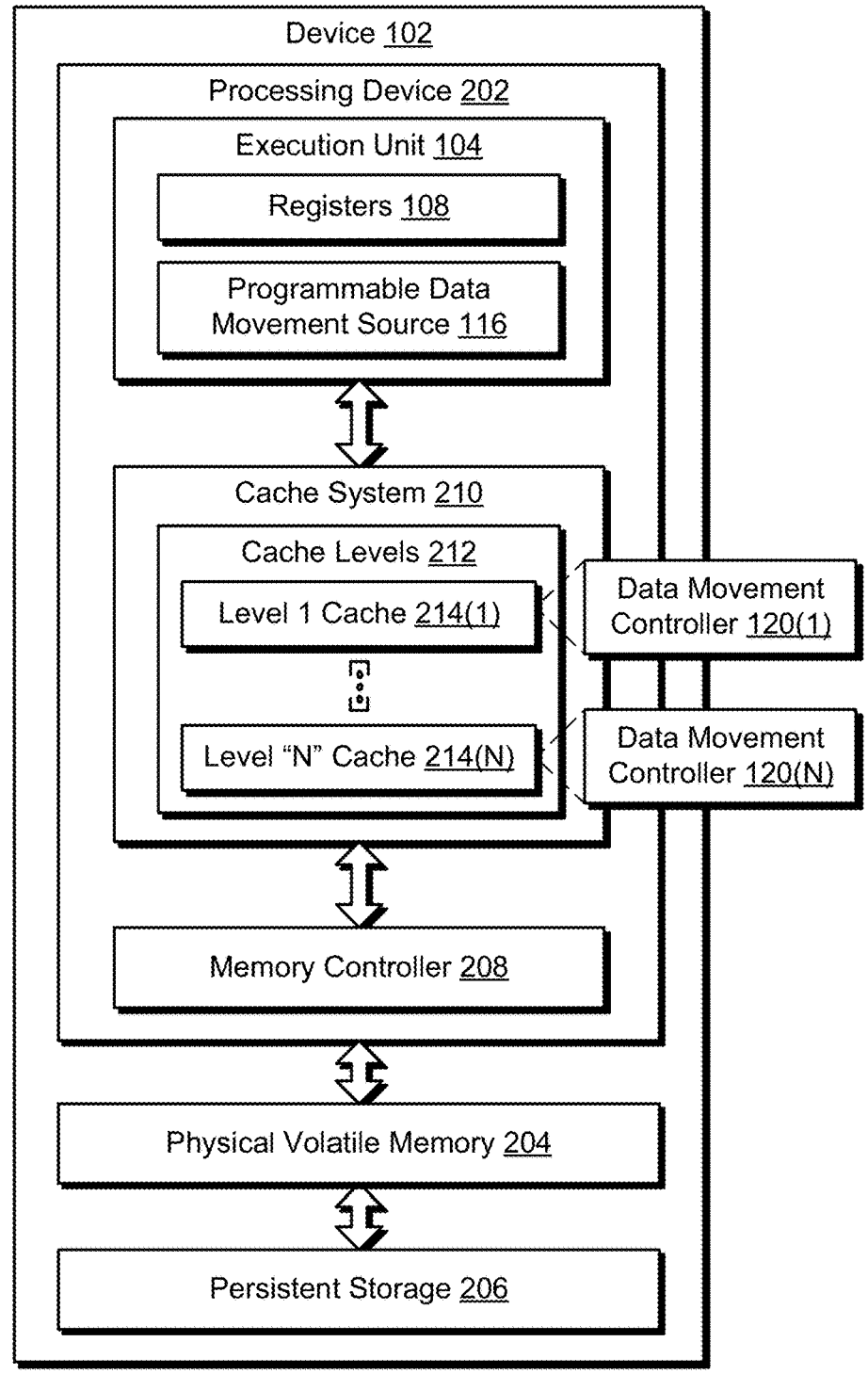
FIG. 2 is a block diagram of a non-limiting example system in which a data storage system, memory hierarchy, and data movement controllers of FIG. 1 are implemented using a plurality of cache levels as part of a cache system.

FIG. 2 is a block diagram of a non-limiting example system 200 in which the data storage system 106, memory hierarchy 112, and data movement controllers 120(1)-120(N) of FIG. 1 are implemented using a plurality of cache levels as part of a cache system. The device 102 includes a processing device 202, physical volatile memory 204, and persistent storage 206. Access to the physical volatile memory 204 and the persistent storage 206 is controlled by a memory controller 208. The processing device 202 is implemented in hardware (e.g., as a single integrated circuit) that includes the execution unit 104 as well as the memory controller 208 and a cache system 210. As such, the cache system 210 is implemented "on chip" along with the execution unit 104 in this example.

The cache system 210 includes a plurality of cache levels 212, examples of which are illustrated as a level 1 cache 214(1) through a level "N" cache 214(N). The cache levels 212 are therefore configured as examples of the memory buffers 114(1)-114(N) of the memory hierarchy 112 of FIG. 1. Data movement controllers 120(1)-120(N) are implemented at respective cache levels to support programmatic control of data movement between the levels.

Configuration of the cache levels 212 is utilized to take advantage of a variety of locality factors. Spatial locality is used to improve operation in situations in which data is requested that is stored physically close to data that is a subject of a previous request. Temporal locality is used to address scenarios in which data that has already been requested will be requested again.

In cache operations, a "hit" occurs to a cache level when data that is subject of a load operation is available via the cache level, and a "miss" occurs when the desired data is not available via the cache level. When employing multiple cache levels, requests proceed through successive cache levels 212 arranged in a hierarchy until the data is located as controlled by respective data movement controllers 120(1)-120(N). A request, for instance, is processed "down" through successive cache levels by respective data movement controllers 120(1)-120(N), the physical volatile memory 204, and the persistent storage 206 until found, i.e., a "hit" occurs. The cache system 210 is configurable in a variety of ways (e.g., in hardware) to address a variety of processor unit configurations, such as a central processing unit cache, a graphics processing unit cache, a parallel processor unit cache, a digital signal processor cache, and so forth.

Figure 3:
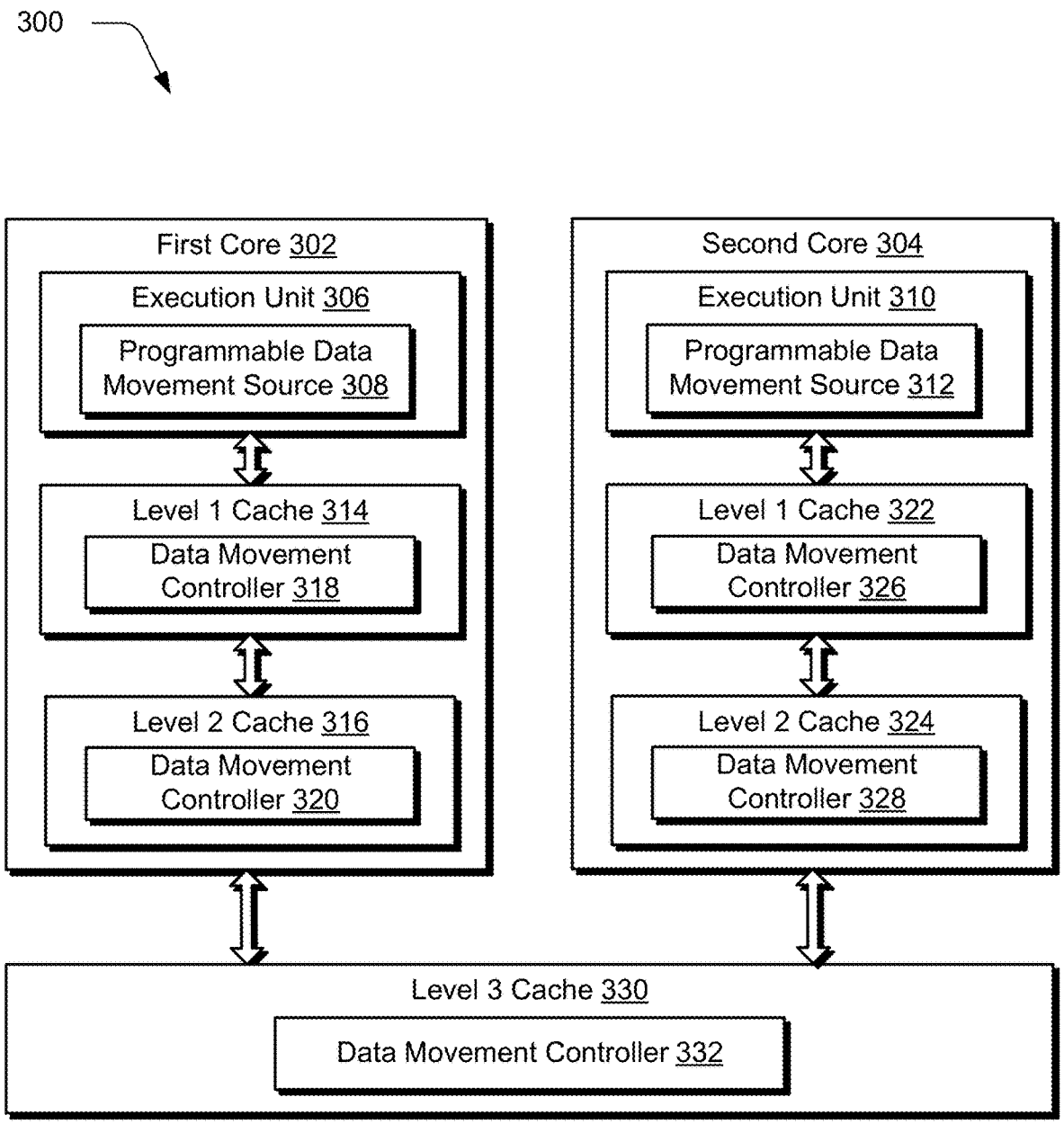
FIG. 3 is a block diagram of a non-limiting example system configured as a multi-core processor architecture as implementing cache levels of FIG. 2.

FIG. 3 is a block diagram of a non-limiting example system 300 configured as a multi-core processor architecture as implementing the cache levels 212 of FIG. 2. The processing device 202 of FIG. 2 is configured as a single integrated circuit having a plurality of cores, illustrated as a first core 302 and a second core 304. The first core 302 includes an execution unit 306 and a programmable data movement source 308. Likewise, the second core 304 also includes an execution unit 310 and a programmable data movement source 312.

The cache system 210 of FIG. 2 as implemented by the first and second cores 302, 304 in the illustrated example of FIG. 3 include use of caches that are dedicated to a particular core as well as shared between cores as a shared cache. The first core 302, for instance, includes a level 1 cache 314 and a level 2 cache 316 having respective data movement controllers 318, 320. Likewise, the second core 304 also includes a level 1 cache 322 and a level 2 cache 324 having respective data movement controllers 326, 328. A level 3 cache 330 having a respective data movement controller 332 is shared by the first and second cores 302, 304.

Other examples are also contemplated, e.g., in which level 2 caches are shared, inclusion of a level 4 cache, and so forth. In one such example, the level 1 caches 314, 322 of the first and second cores 302, 304 are configurable using a split cache architecture that is maintained as two separate level 1 caches, e.g., a level 1 instruction cache and a level 1 data cache. This architecture supports numerous technical features, including simultaneous operation in which data is read from the level 1 data cache in parallel while loading instructions from the level 1 instruction cache.

Figure 4:
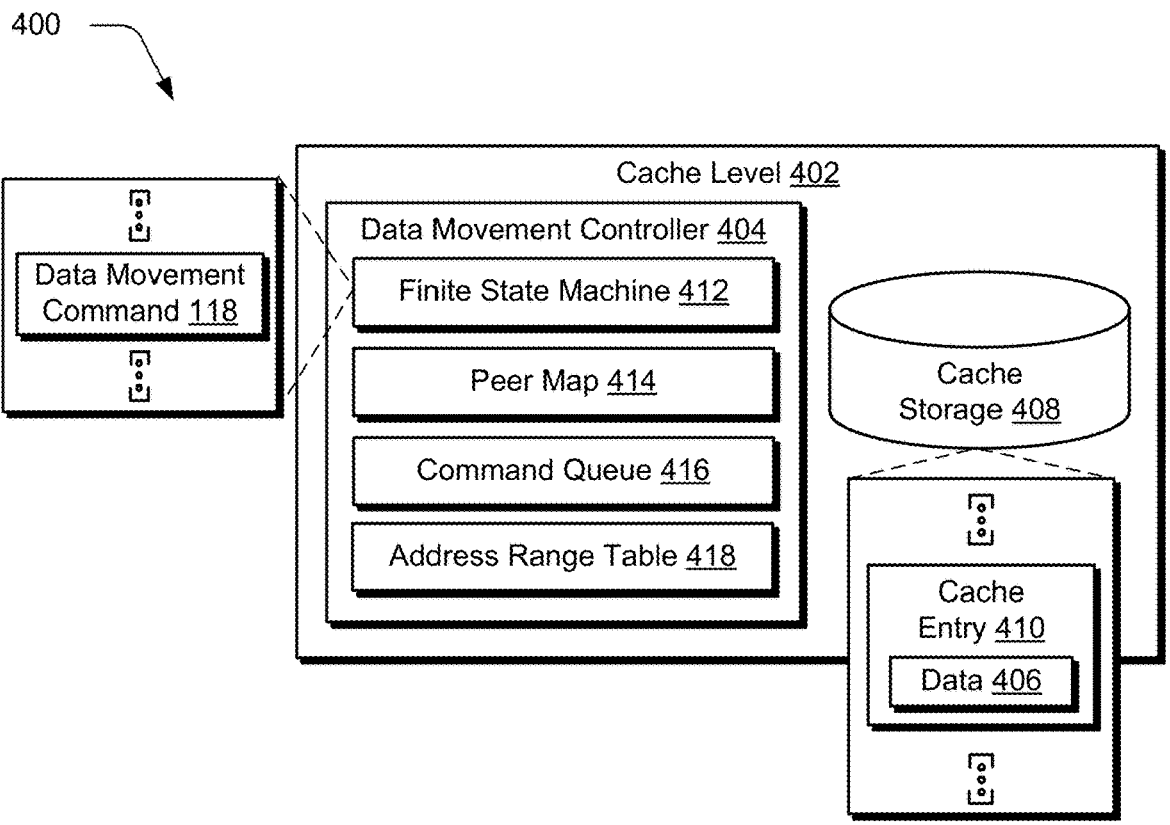
FIG. 4 is a block diagram of a non-limiting example system showing a cache level of FIGS. 2 and 3 in greater detail.

FIG. 4 is a block diagram of a non-limiting example system 400 showing a cache level of FIGS. 2 and 3 in greater detail. In the illustrated example, cache level 402 is representative of any of the plurality of cache levels of FIGS. 2 and 3. The data movement controller 404 is configured to control movement of data 406 involving use of cache storage 408 within the cache level 402. The data movement controller 404, for instance, is configured to control which data 406 is maintained within cache entries 410 in the cache storage 408, where the data 406 stored as part of those entries is originated from, a destination to where data 406 stored as part of those entries is to be transmitted to, and so forth.

Convention techniques used for on-chip data storage are typically implemented in one of two ways. In a first conventional implementation, a workload-agnostic approach is utilized for on-chip hardware managed processor caches, as typically implemented by central processing units, graphics processing units, and so forth. Although this approach places a low burden on software execution or programming of the software, this workload-agnostic design results in inefficiencies as the programmer is not given control over data placement and movement between on-chip structures. Data movement in this conventional example, while triggered by memory requests, is transparent to the programmer and is dictated by underlying workload-agnostic cache policies, e.g., cache replacement policies, cache inclusivity, and so forth. This leads to inefficient utilization of cache and interconnect resources, e.g., when a spike in load operations at the start of a function triggers a spike in a "dirty" data eviction from a prior function that results in critical path contention and delayed execution.

In a second conventional implementation, a workload-specific approach is taken where data storage design is tailored specific to a type of dataflow present, which is typically utilized in application specific integrated circuits (ASICs). Although this supports increased efficiency, this design places an increased burden to orchestrate a specific data placement as part of the ASIC design, which is typically ill suited for other workloads and use cases. Furthermore, this workload-specific strategy is typically limited to short-term usage scenarios and therefore is incapable of addressing domain evolution as is encountered in artificial intelligence and machine learning and even within corresponding subdomains, e.g., recommendation systems, natural language processing systems, and so forth.

To address these challenges, the programmable data storage memory hierarchy techniques employ augmentations in support of programmable data movement. In an example, these techniques leverage existing cache and coherence infrastructures of the cache system 210 and also overlay programmability thereon as part of the data movement controller 404 in support of workload-aware optimizations. These optimizations deliver performance improvements and energy savings in device 102 operation as well as support an ability to address workload evolution which is not possible in conventional techniques.

Examples of augmentations to the data movement controller 404 are illustrated in FIG. 4 as a finite state machine 412, a peer map 414, a command queue 416, and an address range table 418. The finite state machine 412 is configured to process the data movement command 118. The peer map 414 is utilized to facilitate data routing between the memory buffers 114(1)-114(N) of FIG. 1, e.g., the cache levels 212 of FIG. 2. The command queue 416 is utilized to queue and order execution of the data movement commands 118 by the finite state machine 412. The address range table 418 is configurable to aid data residency support.

Addressability is part of facilitating data movement between cache levels. Conventionally, a processor cache at a given level is limited to interactions with cache levels directly above/below itself in a hierarchy as triggered by demand requests, e.g., from cache evictions, and so forth. In a conventional example involving three cache levels, for instance, a level 2 cache is limited to direct communication with a level 1 cache and a level 3 cache as following a hierarchical arrangement of the levels. Accordingly, in one example programmability of the data movement controllers is configured to leverage this hierarchical arrangement of existing cache techniques. Data movement controller 320 as associated with a level 2 cache 316 in FIG. 3, for instance, is programmable to cause data movement to a level 2 cache 324 of a second core 304 by leveraging a shared level 3 cache 330 by using existing communication pathways as implemented by existing cache structures.

In another example, cache levels within a core and/or between cores include communication paths that are added to support direct communication. As such, in this example programmability supported by the techniques described herein supports an ability to employ data movement directly between any of the cache levels including "skipping" intervening cache levels in the hierarchy to move data. This is supported through use of the peer map 414, which is programmable (e.g., by the programmable data movement source 116 via new instructions, operating system functionality, etc.) using information identifying particular cache levels as providing a mapping between caches and cache levels. This is performable in a variety of ways. In a first example, this is performable within caches associated with a particular core, e.g., to cause data to be transmitted from a level 1 cache 314 directly over a communication pathway to a level 3 cache 330 without involving communication through the level 2 cache 316. In a second example, this is performable between cores, e.g., using a communication pathway implemented to support direct communication of data from a level 1 cache 314 of a first core 302 to a level 1 cache 322 of a second core 304. A variety of other examples are also contemplated.

Memory buffers and cache levels are also referred to as "data storage elements" in the following discussion. Examples of this information include a unique identifier for the data-storage element, e.g., to be used with data movement commands 118 as further described below. This information also includes path descriptions. For example, a path to transmit data from a level 2 cache 316 of a first core 302 to a level 2 cache 324 of a second core 304 includes use of a shared level 3 cache 330 in an inclusive cache design as shown in FIG. 3.

Programming of the peer map 414 supports functionality that is made available to the programmable data movement source 116 to specify both a scope of supported data movement (e.g., include/exclude certain caches) and movement (e.g., "hops") to be considered, e.g., the path example above. This programmability also provides a mechanism for translation from a logical cache ID (e.g., a virtual address) used by the software to a physical cache ID in the system (e.g., similar to page translation) and as such supports improved portability and programmability.

In additional examples, data included in the peer map 414 is directly specified as part of the data movement commands 118, which are further discussed below with respect to FIG. 5. In these examples, a data-storage element discovery mechanism is provisioned as part of a programmable data movement source 116. This mechanism allows the programmable data movement source 116 to locate available data storage elements (e.g., memory buffers, cache levels) in the data storage system 106, particular paths between two data storage elements, and so forth. The data movement commands 118 are then invoked by the finite state machine 412 of the data movement controller 404 using this information. Further, compiler and runtime analysis are augmented in this example to use the data-storage discovery mechanism to identify and automatically generate a data movement command 118.

The command queue 416 and finite state machine 412 are used to process the data movement command 118. Upon receipt of a data movement command 118, the finite state machine 412 unrolls the command (e.g., over a specified address range) and consults the peer map 414 to identify actions to be taken to initiate data movement specified by the command. In an additional example, the address range table 418 is provisioned to support tracking of address ranges with specific data residency control. For "stream-not-store" cache blocks belonging to a specific address, for instance, these blocks are configured to preserve data belonging to a given address range by prioritizing evictions of data belonging to other address ranges, evict data belonging to a given address range, and so forth.

As data storage elements perform data movements on behalf of the programmable data movement source 116 (e.g., processing cores), programming of address ranges which indicate data residency criteria aids in preserving the effects of desired data movement. As an example illustrated using FIG. 3, suppose a level 2 cache 316 of a first core 302 is tasked with moving data at address "x-to-y" to a level 2 cache 322 of the second core 304. Additionally, the level 2 cache 322 of the second core 304 is programmed with addresses ranges were previously accessed but for which access is no longer desired, e.g., addresses "p-to-q." When the level 2 cache 322 of the second core 304 receives the data from the level 2 cache 316 of the first core 302, evictions of "p-to-q" are prioritized and incoming values belonging to addresses "x-to-y" are preserved. This is usable as a performance optimization and additional priority logic is provided in this example to address competing residency considerations.

Figure 5:
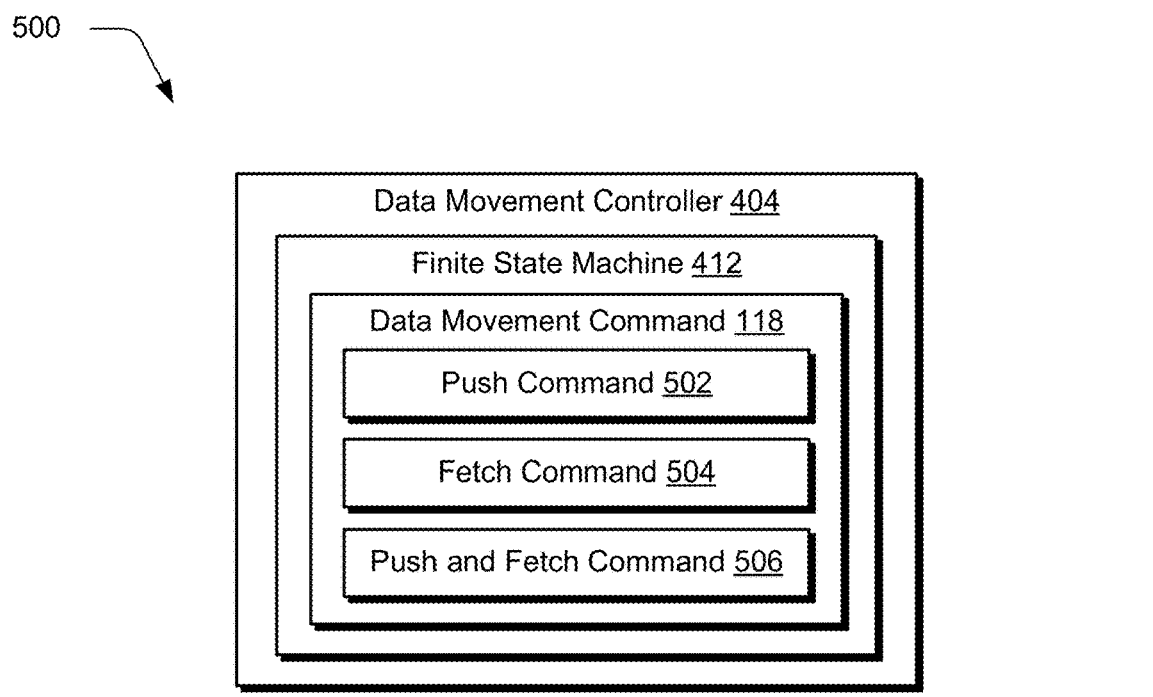
FIG. 5 is a block diagram of a non-limiting example system showing examples of data movement commands executable by a finite state machine of a data movement controller of FIG. 4.

FIG. 5 is a block diagram of a non-limiting example system 500 showing examples of data movement commands 118 executable by a finite state machine 412 of a data movement controller 404 of FIG. 4. The examples include a push command 502, a fetch command 504, and a push-and-fetch command 506.

In one example, these commands specify an address range, at which, data is stored, a destination memory buffer of the plurality of memory buffers, an execution unit that is a source of the data movement command, and/or identifies a particular data movement controller from a plurality of data movement controllers. The push command 502, for instance, is implemented using the following example primitive for data movement:

· Push (address-range, destination-id-hint, processor-id, executor-id)

The push command 502 therefore is configured to cause the finite state machine 412 to move data at a specified address-range to a destination memory buffer 114(1)-114(N) (i.e., a particular data-storage element) specified in a "destination-id-hint." A programmable data movement source 116 and more particularly an execution unit 104 that initiated the command is specified using a "processor-id," while the data movement controller 404 that executes this data movement command 118 is specified using "executor-id."

The fetch command 504 follows a similar structure:

· Fetch (address-range, source-id-hint, processor-id, executor-id)

The fetch command 504 is configured to cause the finite state machine 412 of the data movement controller 404 to fetch data at the specified address-range. A "source-id-hint" is utilized in some implementations, e.g., is used in upstream implementations and is not used in downstream implementations. The programmable data movement source 116 (e.g., a processor core) is specified using "processor-id," while the data movement controller 404 of the cache level 402 that is to execute the data movement command 118 is specified using "executor-id." Alternatively, a "cache-id" is utilized in situations where there are multiple cache levels associated with each core, or the source is at a deeper shared cache level in the hierarchy.

The push-and-fetch command 506 is configured to employ the push command 502 and the fetch command 504 in tandem, thereby filling space in the cache storage 408 freed by pushed data with fetched data as follows:

· Push-and-fetch (address-range-push, destination-id-hint, address-range-fetch, source-id-hint, processor-id, executor-id)

The complementary transfer operations are operable to proceed in "lock step" or for independent execution. In an implementation, a push command is executed before a fetch command and address ranges have a complementary size, e.g., a push command has an address range that is greater than or equal to an address range of the fetch command.

In one example, a destination of a push command 502 and a source of a fetch command 504 involve a data storage element (i.e., memory buffer 114(1)-114(N), cache level 402) along a static path from an executing data movement controller 404 "downward" through memory as defined by a coherence strategy. This is referred to as a "downstream" implementation. In this implementation, a cache level identifier is used for the "destination-id-hint" of a push command 502 without specifying a "source-id-hint" of a fetch command 504. In another "upstream" implementation "upward" through the hierarchy, the data movement command 118 specifies a "destination id" or a "source id" of a data storage element (i.e., memory buffer 114(1)-114(N)) that is not included on a static path through levels of the memory. Other examples are also contemplated, including configuration as a cache eviction that includes an indication (e.g., hint) of a location in the plurality of memory buffers, to which, data is to be evicted. In another example, an ordering primitive is supported that is indicative of completion of the data movement command at a specific memory buffer of the plurality of memory buffers, e.g., to indicate completion to the execution unit 104.

The data movement controller 404 is also configurable to delay or drop data movement based on an inference that the data movement command hinders performance. The data movement controller 404, for instance, includes logic configured to infer when execution of data movement specified by the data movement command will likely hinder performance. This causes the data movement controller 404 to drop or delay data movement associated with the data movement command and send acknowledgements (i.e., "acks") or completion signals in compliance as part of a consistency model or coherence strategy. This is performed, for instance, in a scenario in which there is back pressure on a target outgoing queue (indicating a bottleneck caused by that bandwidth), e.g., in an instance in which a target piece of data is in a transient state in a target cache and therefore indicates that concurrent access to the target data is already in progress.

In the previous examples, data movement involves a contiguous range of memory. Additional examples are also contemplated in which data is obtained from non-contiguous locations using multi-dimensional or indirect access patterns having a specified stride. Capabilities to cancel a prescheduled data movement primitive by the data movement controller 404 are also provided are part of the data movement commands 118. Examples of these data movement commands 118 include "push cancel" and "fetch cancel," which are implemented to remove pending data movement commands 118 from the command queue 416. A "cancel command," for instance, is usable to cancel pending data movement commands, e.g., in situations in which the execution unit 104 determines a pending command is no longer warranted due to delay, synchronization has indicated that the data movement is no longer useful, and so forth.

In some instances, conventional processing devices provision cache coherence between on-chip storage structures by preserving "either single writer or multiple readers" for a given datum. To address this, the programmable data movement operation techniques described herein are configurable to seamlessly work and leverage existing coherence infrastructures.

Data movement, for example, from a cache at a given level to another cache at lower-level is typically performed using "cache evictions," e.g., on eviction, data from a level 1 cache 314 is moved to a level 2 cache 316 "downward" through the hierarchy. The data movement command techniques described herein are configurable to leverage this mechanism for data movement out of a cache level to another cache level, e.g., using a push command 502. This is performable using a data eviction primitive which includes a "destination-id hint" indicating a particular cache level or a unique cache identifier (e.g., using a peer map 414) destined to receive this data.

If the data is not present at a particular cache level (e.g., level 1 cache 314) or it is clean and a silent eviction policy is used for clean data, there are two options in this example. In the first option, the data movement controller 404 skips this address block and continues on to a next address block. In a second option, an eviction primitive is sent along to a next cache level (e.g., level 2 cache 316) in the hierarchy. In multi-level cache hierarchies, the eviction primitive is propagated until it reaches a nearest memory level shared by both a source and destination storage structure. If the evicted data is dirty, the propagated eviction primitive is treated as a write-through request if the destination is at a "deeper" cache level in the hierarchy, or a write followed by an evict if write-through is not supported.

As an example of the upstream implementation in a system of FIG. 3, in a scenario in which a level 2 cache 316 of a first core 302 attempts to push data to a level 2 cache 324 of a second core 304, the level 2 cache 316 leverages an existing cache eviction infrastructure to first evict the data to a shared level 3 cache 330 (e.g., in an inclusive cache design) along with a hint on a proposed destination for the data, e.g., level 2 cache 324 of the second core 304. Upon receipt of the data, the level 3 cache 330 further pushes this data to the level 2 cache 324 of the second core 304 as a "try-load" response message, which allocates space in the destination cache and potentially triggering an eviction operation. If resources are not available, this movement is not performed. For example, in coherence protocols that do not track sharing (e.g., graphics processing units) or that use silent eviction, additional actions are not warranted. However, a separate virtual channel is usable in noisy eviction protocols to ensure the event message reaches a next cache level in the hierarchy without forming a deadlock-causing cycle. In a downstream implementation, this added support is not included for the coherence protocol.

In an additional example, data movement commands 118 support, in collaboration with a coherence directory, handoff of coherence ownership, e.g., from one processor to another. To process a fetch command 504, the data storage system 106 is configurable to add an ability for caches to initiate memory requests on behalf of an execution unit 104, e.g., a processing core as specified using "processor-id." As such, data movements scheduled by programmable data movement source 116 at a cache lead the cache to invoke memory requests and associated coherence actions on behalf of the execution unit 104. In an upstream scenario, these requests are also configurable to include a "source-id hint" indicating a unique cache identifier, e.g., using a peer map 414. This hint is usable by intermediate caches to prioritize further forwarding of the memory request, e.g., for "snoopy" protocols or coarsely-tracked directories, the intermediate caches attempt to request data directly from a "source-id" and send a multicast/broadcast request upon failure.

As caches are configurable to initiate coherence actions on behalf of an execution unit 104, "racy" external accesses involving concurrent access requests are mitigated in one example while a transfer is in progress. This is enforceable via a fence primitive that blocks execution until a completion acknowledgement is received from the executing storage structure. In another example, a coherence scheme is adjusted to handle concurrent accesses during a transfer. Transient states, for instance, are usable to block requests at each cache level while a transfer is in progress. Transfer operations that encounter a transient state cease and are returned.

In a scenario in which "racy" requests form a cycle (e.g., a try-load from a push bypasses a concurrent load from the destination cache), the transfer request is treated as an "acknowledge message" (e.g., "ack") to a concurrent access, and the access is treated as an "acknowledge message" (e.g., "ack") to the transfer request. In an additional example, an ordering primitive is employed which ensures completion of data movement commands 118 invoked by an execution unit 104 as provisioned. This ordering primitive (e.g., as a data movement command 118) is queued by the execution unit 104 at a given cache level and returns an "ack" to the execution unit 104 on completion of each of the data movement commands 118 invoked by the execution unit 104 at the cache. This acts to lower a number of messages from the data storage system 106 to the execution unit 104 (and more particularly the programmable data movement source 116) on completion of the data movement commands 118.

In an implementation, the peer map 414 is further provisioned with functionality to address overflow or overload of data movement commands 118, e.g., at a given cache level. As an example, when a cache level becomes overloaded with data movement commands 118, the peer map 414 utilizes a "forward-to" field that indicates another cache level that is usable to process the data movement commands 118. For instance, if a level 2 cache 316 is overloaded with fetch commands 504 from the first core 302, in response this cache forwards some of these fetch commands 504 to the level 3 cache 330 for processing. In another implementation, the data movement controller 120(*n*) is further augmented to track contention and memory traffic and delay or drop execution of data movement commands if data-storage element is under high load.

By provisioning for programmable data movement, the techniques described herein are configurable to leverage data storage infrastructures while also providing programmer control of data movement. Such control is usable to address heterogenous considerations involved in emerging workloads (e.g., artificial intelligence and machine learning) by supporting workload-aware optimizations. These optimizations include opportunistically pushing data to a cache-level to aid in producer consumer scenarios, prefetching data at a specific cache-level for performance improvements, and so forth.

Figure 6:
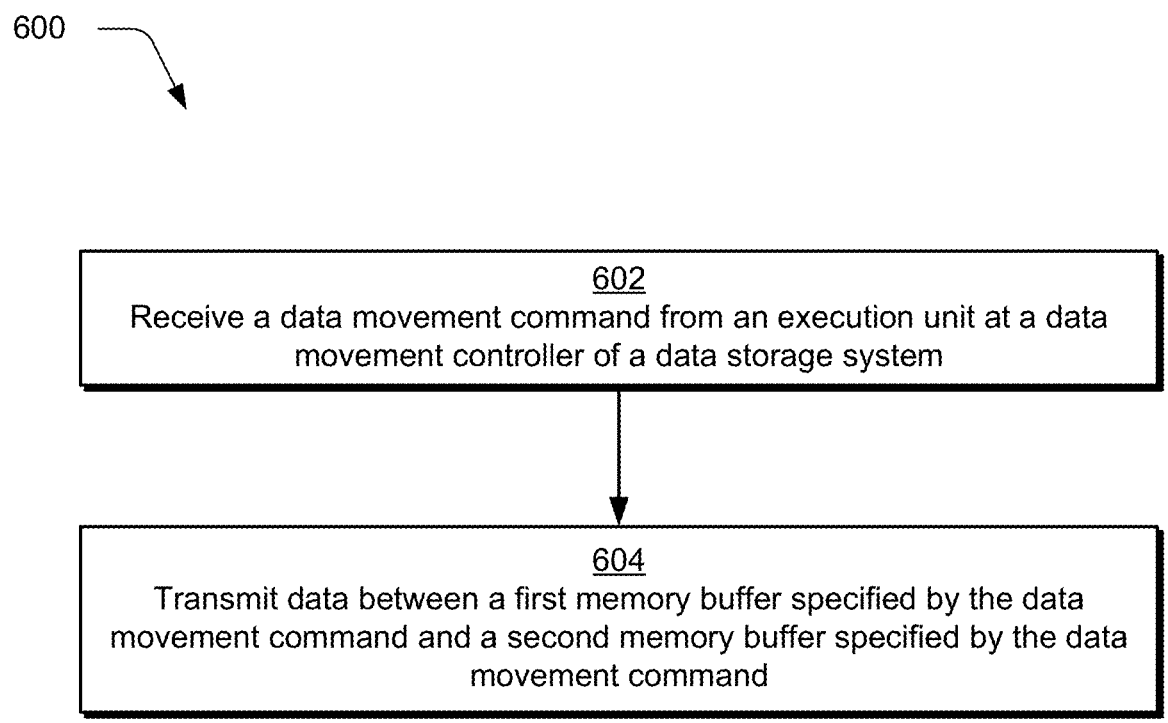
FIG. 6 depicts a procedure in an example implementation of execution of a data movement command by a programmable data storage memory hierarchy.

FIG. 6 depicts a procedure 600 in an example implementation of execution of a data movement command by a programmable data storage memory hierarchy.

A data movement command is received from an execution unit at a data movement controller of a data storage system (block 602). By way of example, a data movement controller 120(1) receives a data movement command 118 from a programmable data movement source 116 executed by an execution unit 104 of a device 102. The execution unit 104, for instance, executes software such as an application, operating system, and so forth to generate the data movement command 118.

Data is transmitted between a first memory buffer specified by the data movement command and a second memory buffer specified by the data movement command (block 604). The first and second memory buffer form a subset of a memory hierarchy. By way of example, the data movement controller 120(1) transmits data from memory buffer 114(1) to memory buffer 114(N) using a fetch command, a push command, and so forth. This is performable, for example, directly between the buffers without employing an intervening buffer disposed between these buffers in the memory hierarchy 112. A variety of other examples are also contemplated.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A data storage system comprising:
   a memory hierarchy having a hierarchical arrangement of a plurality of memory buffers; and
   a data movement controller within the memory hierarchy and configured to receive, from a processing core outside of the memory hierarchy, a data movement command that specifies a location to which data within the memory hierarchy is to be communicated within the memory hierarchy and control data movement of the data between the plurality of memory buffers based on the data movement command and the specified location.

2. The data storage system of claim 1, wherein the data movement command is a push that specifies a location in the plurality of memory buffers, to which, the data is to be transmitted.

3. The data storage system of claim 2, wherein the data movement command identifies the location as an address range, to which, the data is to be transmitted or a memory buffer of the plurality of memory buffers, to which, the data is to be transmitted.

4. The data storage system of claim 1, wherein the data movement command is a cache eviction that includes an indication of a location in the plurality of memory buffers, to which, the data is to be evicted.

5. The data storage system of claim 1, wherein the data movement command is a fetch that includes an indication of a location in the plurality of memory buffers, from which, the data is to be obtained.

6. The data storage system of claim 1, wherein the data movement command specifies a path identifying one or more memory buffers of the plurality of memory buffers, through which, the data is to be transmitted within the memory hierarchy.

7. The data storage system of claim 1, wherein:
   the memory hierarchy is configured as a cache system included in hardware as part of a processing device;
   the plurality of memory buffers is configured as a plurality of cache levels of the cache system included as part of the processing device; and
   the data movement command is generated through software executed by the processing core included in the hardware of the processing device outside the cache system.

8. The data storage system of claim 7, wherein the data movement controller is one of a plurality of data movement controllers associated, respectively, with the plurality of cache levels.

9. The data storage system of claim 1, wherein the data movement controller includes a peer map that is programmable as providing a mapping between the plurality of memory buffers.

10. The data storage system of claim 1, wherein the data movement controller includes a command queue that is configured to queue and order execution of one or more data movement commands.

11. The data storage system of claim 1, wherein the data movement controller is configured to provide an ordering primitive indicating completion of the data movement command at a specific memory buffer of the plurality of memory buffers.

12. The data storage system of claim 1, wherein the data movement controller is configured to delay or drop the data movement based on an inference that the data movement command hinders performance.

13. The data storage system of claim 1, the data movement controller is configured to cancel the data movement command based on receipt of a cancel command.

14. The data storage system of claim 1, wherein the data movement controller is configured to block external access to the data that is a subject of the data movement command until receipt of a completion acknowledgement.

15. A device comprising:
a processing core implemented in hardware of an integrated circuit and configured to generate data movement commands that specify locations within a plurality of cache levels from where data is to be obtained within the plurality of cache levels, the processing core being disposed outside the plurality of cache levels; and
a data storage system implemented in the hardware of the integrated circuit, the data storage system including a plurality of data movement controllers disposed, respectively, in the plurality of cache levels, the plurality of data movement controllers configured to control the data movement between the plurality of cache levels to the specified location through execution of the data movement commands received from outside the data storage system and the specified location.

16. The device of claim 15, wherein the data movement commands include a push command that is configured to transmit data to a respective cache level of the plurality of cache levels.

17. The device of claim 15, wherein the data movement commands include a fetch command that is configured to cause data to be transmitted from a respective cache level of the plurality of cache levels.

18. The device of claim 15, wherein the plurality of data movement controllers includes, respectively, a plurality of finite state machines configured to process the data movement commands.

19. A method comprising:
receiving, from a processing core outside a memory hierarchy, a data movement command that specifies a first memory buffer location to which data within the memory hierarchy is to be communicated within the memory hierarchy and a second memory buffer from where the data is to be obtained within a plurality of memory buffer levels at a data movement controller of a data storage system within the memory hierarchy; and
transmitting the data between the first memory buffer specified by the data movement command and the second memory buffer specified by the data movement command and the specified location by executing the data movement command by the data movement controller, the first memory buffer and the second memory buffer arranged to form a subset of the memory hierarchy.

20. The method of claim 19, wherein the data movement command is received through execution of an operating system or application by the processing core.

* * * * *